United States Patent Office 3,567,376
Patented Mar. 2, 1971

3,567,376
PREPARATION OF PHOSPHORIC ACID FROM GYPSUM AND PHOSPHATE ROCK
William A. Satterwhite, Lakeland, and Fred J. Klem, Brandon, Fla., assignors to United States Steel Corporation, Pittsburgh, Pa.
Continuation-in-part of application Ser. No. 740,079, June 26, 1968. This application June 27, 1968, Ser. No. 740,711
Int. Cl. B01j *1/00;* C01b *25/18, 33/00*
U.S. Cl. 23—165
12 Claims

ABSTRACT OF THE DISCLOSURE

Phosphate rock is digested with sulfuric acid to produce phosphoric acid and calcium sulfate. An alkali metal sulfate is reacted with fluosilicic acid to produce sulfuric acid and the metal silicofluoride, the sulfuric acid being recycled to the digestion step. The silico-fluoride is calcined with silicon oxide to produce the alkali metal silicate and silicon tetrafluoride. The calcium sulfate from the digestion step together with the metal silicate are calcined to produce the metal sulfate and calcium silicate. Water in the form of weak phosphoric recycle is added to the silicon tetrafluoride to produce fluosilicic acid, and the metal sulfate and the fluosilicic acid are recycled to the reaction step described above for producing the sulfuric acid. To reduce the amount of water brought into the system and to reduce evaporation requirements, the metal sulfate may be separated by crystallization and may be dissolved in weak phosphoric acid recycle, and the silicon tetrafluoride may be absorbed in the solution to form the metal silicofluoride which when reacted with recycled fluosilicic acid generates the sulfuric acid.

RELATED APPLICATION

This is a continuation-in-part of our copending application Ser. No. 740,079 filed June 26, 1968 and entitled "Phosphoric Acid Manufacture From Gypsum and Phosphate Rock."

BACKGROUND AND SUMMARY

The use of sulfuric acid in digesting phosphate rock to obtain phosphoric acid is desired for many reasons, but because of the shortage of sulfuric acid and its increasing cost, workers in the field have been seeking for many years to find processes for meeting this problem. Other acids have been employed with less success and less satisfactory products have been produced. A problem is also presented in the phosphoric acid manufacture with respect to bringing into the system substantial amounts of water and the need for evaporation of water in the concentration of phosphoric acid.

We have discovered that it is possible to prepare sulfuric acid utilizing the calcium sulfate produced in the sulfuric acid digestion process together with other reactants so that the sulfuric acid can be recycled to the digestion step while withdrawing as a by-product calcium silicate, the recycle process being carried on without requiring the addition of large amounts of water and the evaporation of the same. In the reaction steps, we recover potassium or sodium sulfate by crystallization and we dissolve the sulfate in weak phosphoric acid recycle and then utilize this solution for absorbing silicon tetrafluoride. In the process which utilizes cyclic reactants, two key components for phosphoric acid manufacture, namely, H+ ion and $SO_4^=$ ion, are prepared.

DRAWING

The accompanying drawing sets out a diagrammatic flow sheet of a process embodying our invention.

DETAILED DESCRIPTION

Our new process may be illustrated generally by the following equations:

1. $Ca_3(PO_4)_2 + 3H_2SO_4 + 2H_2O \longrightarrow 3CaSO_4 \cdot 2H_2O \downarrow + 2H_3PO_4$
2. $3K_2SO_4 + 3H_2SiF_6 \longrightarrow 3K_2SiF_6 \downarrow + 3H_2SO_4$
3. $3K_2SiF_6 + 1\tfrac{1}{2}SiO_2 \xrightarrow{\text{Calcine}} 3K_2SiO_3 + 4\tfrac{1}{2}SiF_4 \uparrow$
4. $3K_2SiO_3 + 3CaSO_4 \cdot 2H_2O \xrightarrow{\text{Calcine}} 3K_2SO_4 + 3CaSiO_3 \downarrow + 2H_2O$
5. $4\tfrac{1}{2}SiF_4 + H_2O \longrightarrow 3H_2SiF_6 + 1\tfrac{1}{2}SiO_2 \downarrow$ In the above process, step 1 represents the usual or conventional sulfuric acid digestion process which produces phosphoric acid and calcium sulfate.

Steps 4 and 5 produce the reactants for step 2 which form the $H_2SO_4$. Step 3 releases the fluoride for $SiF_4$ evolution and subsequent recovery and formation of $H_2SiF_6$. Thus the H+ in step 5 and the $SO_4^=$ in step 4 are provided to effect the manufacture of phosphoric acid via $H_2SO_4$ in step 1. Heat is required in steps 3 and 4 and in a sense is the only raw material required. The process is cyclic with regard to fluoride and potassium. Calcium silicate rather than gypsum becomes the by-product.

The temperatures of calcining in steps 3 and 4 may be varied to bring about the reactions indicated. Usually temperatures of about 1800–1900° F. are sufficient for this purpose, but higher and lower temperatures may be used.

While in the illustrative equations set out above, we have shown potassium, it will be understood that sodium or any other alkali metal which forms an insoluble silicofluoride may be used as the cyclic metal.

If desired, steps 3 and 4 may be combined so as to employ one calcining step. However, we prefer to employ the separate steps so as to bring about complete evolution of fluorine. By separately decomposing the $K_2SiF_6$, we can maintain a very strong $SiF_4$ gas evolution. Since the $K_2SiO_3$ is a low viscosity melt at about 1800° F., we prefer to employ an electric resistance furnace for such heating to avoid combustion gases which might dilute the $SiF_4$ with $H_2O$, $CO_2$, $N_2$, etc. if steps 3 and 4 were combined. Since the calcination charge in step 4 is solid, we prefer to treat it in a rotary kiln or similar equipment which may employ hot combustion gases as the heat source.

In the above process, instead of absorbing the silicon tetrafluoride gas in water, we absorb it in weak phosphoric acid recycle. Further, we prefer to add to the phosphoric acid recycle the alkali metal sulfate and to absorb the silicon tetrafluoride in the resulting solution. The fluosilicic acid reacts with the alkali metal sulfate for the production of sulfuric acid which is then recycled together with phosphoric acid to the digestion step.

We also find that water evaporation can be greatly reduced by recovering the alkali metal sulfate in a concentrated form, and preferably in crystalline form. The crystalline sulfate is recycled and dissolved in the weak phosphoric acid recycle and the resulting solution used for absorbing the silicon tetrafluoride. The heat from calcining calcium sulfate and the metal silicate is effectively employed in the crystallizing of the metal sulfate, as will be described later.

The foregoing process is described in the flow sheet of the drawing, the alkali metal sulfate being shown as $K_2SO_4$. In the operation, calcium sulfate and phosphoric acid are passed through a gypsum filter, phosphoric acid being separated into two streams, one stream being sent to the product tank and the other stream forming a recycle stream for dissolving recycled potassium sulfate. The potassium sulfate and phosphoric acid solution are employed for absorbing silicon tetraflouride, and the silicon tetrafluoride is converted to fluosilicic acid which reacts with the potassium sulfate to form sulfuric acid. The sulfuric acid together with phosphoric acid are returned to the digestion step, and the potassium silicofluoride which is separated in the rotary filter is dried and then calcined in an electric furnace to which silicon oxide in the form of tailings (90% $SiO_2$) is added. In this operation, silicon tetrafluoride gas is evolved, as shown in the drawing, while potassium silicate is withdrawn and mixed with calcium sulfate in a blender. The mass is then calcined, and the solution of potassium sulfate and calcium silicate is mixed, and the calcium silicate separated in a filter and withdrawn. The solubility difference for $K_2SO_4$ in water between 100° F. and 212° F. is around 20 percent. Thus, the hot potassium sulfate leach solution in step 4 is cooled to crystallize the $K_2SO_4$. The crystals are removed and the dilute, cool solution is returned, as shown by arrows in the drawing, to the $K_2SO_4$ and $CaSiO_3$ dissolution step. Heat is obtained by discharging the hot calcine into the dissolution tank. The hot solution re-saturates in $K_2SO_4$ and flows back to the crystallizer. As shown in the drawing, the crystals may be separated by a centrifuge ("cent.") and the crystals returned and dissolved in the recycle phosphoric acid tank.

Specific examples illustrative of the invention may be set out as follows:

EXAMPLE I

Phosphate rock was digested with sulfuric acid as described in Equation 1 resulting in the preparation of phosphoric acid and calcium sulfate, the calcium sulfate being separated by filtration. Recycled potassium and sulfate were combined with recycled fluosilicic acid producing potassium silicofluoride and sulfuric acid, the sulfuric acid being recycled to the digestion step. Silicofluoride was added to silicon oxide and the mixture calcined at 1800° F. to produce silicon tetrafluoride and potassium silicate. In this step, the following quantities of $K_2SiF_6$ and $SiO_2$ or flotation tailings (90% $SiO_2$) were mixed and calcined in a muffle furnace at 1800° F. Completion of the reaction is reflected by the percent F remaining in the $K_2SiO_3$ residue.

| Run No. | $K_2SiF_6$, wt. gms. | Percent F | $SiO_2$, wt. gms. | Calcination time, hrs. | $K_2SiO_3$ residue, Percent F |
|---|---|---|---|---|---|
| 12168 | 17.75 | 52.0 | 13.1 | 1 | 7.80 |
| 12868 | 17.75 | 52.0 | 14.5 | 3 | 4.20 |
| 22868 | 17.75 | 52.0 | 19.0 | 3 | 0.45 |
| 121568 | 17.75 | 52.0 | 19.0 | 3 | 0.65 |

The above indicates that an excess of silicon oxide above stoichiometric is desired to carry the reaction to completion. Better than 98 percent of the fluorine was evolved.

With respect to step 4 in which the potassium silicate is calcined with the calcium sulfate from the digestion step, the following runs were performed to effect a double decomposition of $CaSO_4 \cdot 2H_2O$ and $K_2SiO_3$ residue. The mixtures were calcined at 1800–1900° F. for ½ to 2 hours.

| Run No. | $K_2SiO_3$, gms. | $CaSO_4 \cdot 2H_2O$ wet basis, gms. | Time, hrs. | Temp., °F. | Calcine product $SO_4$ total, percent | $SO_4$ $H_2O$ sol., percent | $SO_4$ conversion, percent |
|---|---|---|---|---|---|---|---|
| 121568 | 5 | 4.5 | ½ | 1,800 | 23.66 | 22.84 | 96.4 |
| 12568 | 5 | 5.9 | 1 | 1,900 | 25.85 | 24.75 | 95.8 |
| 42868 | 5 | 7.2 | ¼ | 1,800 | 30.05 | 28.45 | 94.7 |
| 32868 | 5 | 7.2 | 2 | 1,900 | 29.20 | 28.35 | 97.2 |

The insoluble calcium sulfate ($CaSO_4 \cdot 2H_2O$, which was the starting material) was decomposed to produce potassium sulfate in an extractable form which was then dissolved in water, leaving the calcium silicate undissolved. The calcium silicate was filtered out and discarded. The potassium sulfate was recycled to step 2.

In step 5, the silicon tetrafluoride was mixed with water in the form of weak phosphoric acid recycle and the resulting fluosilicic acid was reacted with potassium sulfate for the preparation of sulfuric acid. The sulfuric acid together with the recycle phosphoric acid were returned to the digestion step, as shown in the flow sheet of the drawing.

EXAMPLE II

The process was carried out as described in Example I except that the potassium silicate from the electric furnace, as shown in the flow sheet of the drawing, was blended with calcium sulfate and the mixture calcined and sent to a dissolution tank in which potassium sulfate and calcium silicate were separated. The insoluble calcium silicate was removed in a filtering operation and the potassium sulfate solution was cooled to crystallize the potassium sulfate. The potassium sulfate crystals were recycled and dissolved in the phosphoric acid recycle tank, while the cooled solution, after the removal of the potassium sulfate crystals, was returned to the potassium sulfate dissolution tank.

EXAMPLE III

Process procedures as described in Examples I and II are employed, using sodium instead of potassium and with comparable results.

While in the preferred form of our invention, the potassium sulfate is concentrated and preferably crystallized, recycled, and dissolved in a phosphoric acid recycle solution and the silicon tetrafluoride is absorbed in the resulting solution, it will be understood that these steps need not be employed in combination.

While in the foregoing specification we have set out specific steps in considerable detail for the purpose of illustrating embodiments of our invention, it will be understood that such details may be varied widely by those skilled in the art without departing from the spirit of our invention.

We claim:
1. In a process for the preparation of phosphoric acid in which phosphate rock is digested with sulfuric acid to produce phosphoric acid and calcium sulfate and in which weak phosphoric acid is recycled to the digestion system, the improvement comprising reacting an alkali metal sulfate with fluosilicic acid to produce sulfuric acid and alkali metal silicofluoride, calcining said alkali metal silicofluoride with silicon oxide to produce alkali metal silicate and silicon tetrafluoride, calcining said alkali metal silicate with said calcium sulfate to produce calcium silicate and said alkali metal sulfate, removing said calcium silicate, mixing said alkali metal sulfate with said weak phosphoric acid recycle to form a solution, absorbing said silicon tetrafluoride in said solution to form fluosilicic acid for reaction with said alkali metal sulfate in the forming of said sulfuric acid, and recycling said sulfuric acid to said digestion step.

2. The process of claim 1 in which the alkali metal sulfate is selected from the group consisting of potassium and sodium sulfate.

3. The process of claim 1 in which said alkali metal sulfate produced in said calcining step is mixed with a small portion of said phosphoric acid recycle to form a solution and said silicon tetrafluoride is absorbed in said solution.

4. The process of claim 1 in which said alkali metal sulfate is concentrated before being dissolved in said phosphoric acid recycle.

5. The process of claim 4 in which said alkali metal sulfate is concentrated by cooling the solution to crystallize the alkali metal sulfate.

6. In a process for the preparation of phosphoric acid in which phosphate rock is digested with sulfuric acid to produce phosphoric acid and calcium sulfate, the improvement comprising reacting an alkali metal sulfate with fluosilicic acid to produce sulfuric acid and alkali metal silicofluoride, recycling said sulfuric acid to said digestion step, calcining said alkali metal silicofluoride with silicon oxide to produce alkali metal silicate and silicon tetrafluoride, calcining said alkali metal silicate with said calcium sulfate to produce said alkali metal sulfate solution and calcium silicate, removing the calcium silicate, cooling said alkali metal sulfate solution to crystallize said alkali metal sulfate, adding water to said silicon tetrafluoride to produce fluosilicic acid, and recycling said alkali metal sulfate and fluosilicic acid to said reaction step for producing said sulfuric acid.

7. The process of claim 6 in which the alkali metal sulfate is selected from the group consisting of potassium and sodium sulfate.

8. In a process for the preparation of phosphoric acid in which phosphate rock is digested with sulfuric acid to produce phosphoric acid and calcium sulfate, a portion of the phosphoric acid being recycled to the digestion step, the improvement comprising reacting an alkali metal sulfate selected from the group consisting of potassium and sodium sulfate with fluosilicic acid to produce sulfuric acid and potassium or sodium silicofluoride, adding silicon oxide to said potassium or sodium silicofluoride and heating the same to form silicon tetrafluoride and potassium or sodium silicate, mixing said potassium or sodium silicate with calcium sulfate from said digestion step and heating the mixture to form potassium or sodium sulfate and calcium silicate, removing said calcium silicate and concentrating said potassium or sodium sulfate, mixing said concentrated potassium or sodium sulfate with said phosphoric acid recycle in a solution, absorbing said silicon tetrafluoride in said solution to form fluorisilicic acid for reaction with said potassium or sodium sulfate in the forming of said sulfuric acid, and recycling said sulfuric acid and phosphoric acid recycle to said digestion step.

9. The process of claim 8 in which the calcined potassium or sodium sulfate solution is separated from said calcium silicate and while still hot is cooled to crystallize said potassium or sodium sulfate.

10. The process of claim 9 in which said potassium or sodium sulfate crystals are separated and mixed with said phosphoric acid recycle.

11. In a process for the preparation of phosphoric acid in which phosphate rock is digested with sulfuric acid to produce phosphoric acid and calcium sulfate, the improvement comprising reacting potassium sulfate with fluorosilicic acid to produce sulfuric acid and potassium silicofluoride, adding silicon oxide to said potassium silicofluoride and heating the same to form silicon tetrafluoride and potassium silicate, mixing said potassium silicate with calcium sulfate from said digestion step and heating the mixture to form potassium sulfate and calcium silicate, removing said calcium silicate and crystallizing said potassium sulfate, mixing said potassium sulfate with phosphoric acid recycle, absorbing said silicon tetrafluoride in said phosphoric acid recycle and potassium sulfate solution to form fluosilicic acid for reaction with said potassium sulfate in the forming of said sulfuric acid, and recycling said sulfuric acid and phosphoric acid recycle to said digestion step.

12. In a process for the preparation of phosphoric acid in which phosphate rock is digested with sulfuric acid to produce phosphoric acid and calcium sulfate and in which weak phosphoric acid is recycled to the digestion system, the improvement comprising reacting equimolar amounts of an alkali metal sulfate with fluosilicic acid to produce sulfuric acid and the alkali metal silicofluoride, calcining said alkali metal silicofluoride with an excess silicon oxide to produce the alkali metal silicate and silicon tetrafluoride, calcining equimolar amounts of said alkali metal silicate with said calcium sulfate to produce calcium silicate and said alkali metal sulfate, removing said calcium silicate, mixing said alkali metal sulfate with said weak phosphoric acid recycle to form a solution, absorbing said silicon tetrafluoride in said solution to form fluosilicic acid for reaction with said metal sulfate in the forming of said sulfuric acid, and recycling said sulfuric acid to said digestion step.

References Cited
UNITED STATES PATENTS

| | | | |
|---|---|---|---|
| 997,086 | 7/1911 | Peacock | 23—165A |
| 3,488,702 | 1/1970 | Giraitis et al. | 23—110 |

OSCAR R. VERTIZ, Primary Examiner

H. S. MILLER, Assistant Examiner

U.S. Cl. X.R.

23—110, 285